(12) United States Patent
Yokouchi et al.

(10) Patent No.: US 8,801,074 B2
(45) Date of Patent: Aug. 12, 2014

(54) BODY COVER STRUCTURE FOR SADDLE-RIDE TYPE VEHICLE

(71) Applicant: Honda Motor Co., Ltd., Tokyo (JP)

(72) Inventors: Kohei Yokouchi, Wako (JP); Tomoyuki Maruyama, Wako (JP); Tomotake Shimoji, Wako (JP); Tetsuo Kojima, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 13/875,551

(22) Filed: May 2, 2013

(65) Prior Publication Data

US 2013/0320696 A1    Dec. 5, 2013

(30) Foreign Application Priority Data

May 31, 2012 (JP) ................................. 2012-124358

(51) Int. Cl.
*B60N 3/06* (2006.01)
(52) U.S. Cl.
USPC ............... 296/75; 180/90.6; 74/564; 280/291

(58) Field of Classification Search
USPC ............... 296/75; 180/90.6; 74/564; 280/291
See application file for complete search history.

(56) References Cited

U.S. PATENT DOCUMENTS 7,490,890 B2 *   2/2009   Nakabayashi et al. .......... 296/75
7,594,671 B2 *   9/2009   Danze ........................... 280/163

FOREIGN PATENT DOCUMENTS

JP         2008-213520 A         9/2008

* cited by examiner

*Primary Examiner* — Joseph Pape
(74) *Attorney, Agent, or Firm* — Birch, Stewart, Kolasch & Birch, LLP

(57) ABSTRACT

A body cover structure for saddle-ride type vehicles that enables enhancement of the user's comfort while increasing the rigidity of covering members constituting a center tunnel part. Step floors are configured of forward inclined parts disposed ahead of the floors in a forward rising shape, horizontal parts disposed either substantially horizontally or in a rearwardly rising shape behind these forward inclined parts, and bent parts connecting the forward inclined parts and the horizontal parts. The middle covers are provided on the lower edges thereof with downwardly extending parts extending toward the bent parts.

20 Claims, 13 Drawing Sheets

BODY COVER STRUCTURE FOR SADDLE-RIDE TYPE VEHICLE

CROSS-REFERENCE TO RELATED APPLICATIONS

The present application claims priority under 35 USC 119 to Japanese Patent Application No. 2012-124358 filed May 31, 2012 the entire contents of which are hereby incorporated by reference.

BACKGROUND OF THE INVENTION

1. Field of the Invention

The present invention relates to a body cover structure intended for use on a saddle-ride type vehicle. The body cover structure is provided with a cover member making up a center tunnel part arranged between a seat and a leg shield covering from ahead the legs of its occupant.

2. Description of Background Art

Saddle-ride type vehicles are known wherein a body cover structure is provided with a center tunnel part between a leg shield for covering in front of the legs of its occupant and a seat on which the occupant sits. Step floors are provided for placing the legs of an occupant. The step floors are arranged on the two sides of the center tunnel part with the center tunnel part being configured of a plurality of covering members. See, for example, JP-A No. 2008-213520.

In a structure with center tunnel part covering members extending in the longitudinal direction, if the rigidity of these covering members is to be increased, enlarging the covering members and arranging the covering members close to the step floors might involve the disadvantage that the occupant's comfort in placing his or her legs on the step floors is impaired by the boundary parts between the covering members and the step floors.

SUMMARY AND OBJECTS OF THE INVENTION

The present invention, attempted in view of the circumstance noted above, is intended to provide a body cover structure for saddle-ride type vehicles that is capable of ensuring an improved comfort of the occupant while increasing the rigidity of the covering members making up the center tunnel part.

In order to address the problem noted above, according to an embodiment of the present invention, in a body cover structure for saddle-ride type vehicles that is provided with a center tunnel part (250) provided between a seat (10) and a leg shield (601) covering the front part of a body, and step floors (68) for putting on legs of an occupant that are disposed on the two sides of the center tunnel part (250) so as to extend in the longitudinal direction, the center tunnel part (250) are configured of an inner cover (53) extending rearwardly from the leg shield (601) with erect walls (55) extending upward from the inner side end parts of the step floors (68) in the vehicle width direction. Middle covers (54) are arranged to be long in the longitudinal direction so as to stride over the inner cover (53) and the erect walls (55), wherein the step floors (68) are configured of forward inclined parts (68a) disposed ahead of the floors in a forward rising shape. Horizontal parts (68b) are disposed either substantially horizontally or in a rearwardly rising shape behind these forward inclined parts (68a) with bent parts (68c) connecting the forward inclined parts (68a) and the horizontal parts (68b). The middle covers (54) are provided on the lower edges thereof with downwardly extending parts (54c) extending toward the bent parts (68c). This configuration enables riding comfort to be enhanced while expanding the area of the middle covers.

According to an embodiment of the present invention, the middle covers (54) may have, formed on the front edges thereof, dented parts (54g) recessed toward the rear part of the body above the downwardly extending parts (54c). As the configuration enables, when legs are placed on the forward inclined parts of the step floors, a large area of the erect walls to be secured by the dented parts, riding comfort can be enhanced.

According to an embodiment of the present invention, front end parts (54f) of the middle covers (54) may be arranged in higher positions than the forward inclined parts (68a). As the configuration does not entail a boundary formation between the front end parts of middle covers and the erect walls, riding comfort can be enhanced.

According to an embodiment of the present invention, down frames (13) and upper frames (15) are arranged above these down frames (13) and extend to the rear downwardly from a head pipe (12) constituting the front end part of a body frame (F). The down frames (13) and forward extending parts (54b) constitute the upper parts of the middle covers (54) and extending toward the front part of the body may be arranged so as to overlap each other in a side view. As in this configuration, the arrangement of the down frames near a high rigidity part enables the body frame and the covering members to be arranged close to each other. Thus, design compactness can be achieved.

According to an embodiment of the present invention, the erect walls (55) may be provided with stepped parts (55g) so as to run along the front edges of the middle covers (54) and the front edges of the middle covers (54) may be brought into contact with and fitted to these stepped parts (55g). As the configuration enables the front edges of the middle covers to be formed in a convexo-concave shape by the downwardly extending parts and the dented parts, positioning of the middle covers in the longitudinal and vertical directions is facilitated by bringing them into contact with and fitting to the stepped parts.

According to an embodiment of the present invention, a first engaging part (241) with which the inner cover (53) and the erect wall (55) are engaged may be provided inside the middle covers (54). In addition, second engaging parts (242) with which the inner cover (53), the erect walls (55) and the middle covers (54) are engaged may be provided at the upper and lower end parts of the middle covers (5.4) so as to sandwich the first engaging part (241) vertically. This configuration enables the number of fastening parts to be kept to a practicable minimum and various body covers to be firmly linked by engagement.

According to an embodiment of the present invention, concaves (83) extending in the longitudinal direction of the body may be provided on boundaries between the middle covers (54) and the erect walls (55). This configuration enables the force to hold the occupant's body to be secured by providing the concaves matching the occupant's ankles or the like while restraining interference with swelling parts such as the occupant's ankles.

According to an embodiment of the present invention, the erect walls (55) may be disposed farther out than the middle covers (54) in the vehicle width direction. This configuration enables freedom to enhance the arrangement of the occupant's legs.

According to an embodiment of the present invention, the bent parts (68c) may be provided underneath the forward inclined part (68a) with a second bent part (68e) that becomes convex toward the rear in a side view, and the second bent part (68e) may be closer to the downwardly extending part (54c) than the step floors near the second bent part. This configuration enables legs to be placed with the second bent part as the fulcrum. Thus, the strength of the erect walls in this region may be enhanced with the erect walls before and behind the legs to be formed larger. Therefore, even if the legs are swung with the second bent part as the fulcrum, the foot contact may be secured by the erect walls.

According to an embodiment of the present invention, as each step floor is configured of the forward inclined part disposed in its forward part in a forward rising shape and the horizontal part disposed either substantially horizontally or in a rearwardly rising shape behind the forward inclined part, the forward inclined part and the horizontal part are connected by the bent part, and each of the middle covers has on its lower edge the downwardly extending part extending toward the bent part. Thus, riding comfort can be enhanced while expanding the area of the middle covers.

Further, as each of the middle covers has on its forward edge the dented part recessed toward the rear part of the body above the downwardly extending part, a large area can be secured for the forward inclined parts by the dented part when legs are placed on the step floors. Thus, riding comfort can be enhanced.

Further, as the forward end part of each of the middle covers is arranged higher than the forward inclined part and accordingly no boundary is formed by the forward end part of middle cover and the erect wall, riding comfort can be enhanced.

Further, as down frames and upper frames arranged above these down frames extend to the rear downwardly from a head pipe constituting the front end part of a body frame, and the down frames and forward extending parts constituting the upper parts of the middle covers and extending toward the front part of the body are arranged so as to overlap with each other in a side view, the arrangement of the down frames near a high rigidity part enables the body frame and the covering members to be arranged close to each other, thereby enabling design compactness to be achieved.

Further, as the erect walls are provided with stepped parts so as to run along the front edges of the middle covers and the front edges of the middle covers are brought into contact with and fitted to these stepped parts, the front edges of the middle covers can be formed in a convexo-concave shape by the downwardly extending parts and the dented parts. Thus, the positioning of the middle covers in the longitudinal and vertical directions is facilitated by bringing them into contact with and fitting to the stepped parts.

Further, as the first engaging part with which the inner cover and the erect wall are engaged are provided inside the middle covers, and second engaging parts with which the inner cover, the erect walls, and the middle covers are engaged are provided at the upper and lower end parts of the middle covers so as to sandwich the first engaging part vertically. Thus, it is possible to keep the number of fastening parts to a minimum and various body covers can be firmly linked by engagement.

Further, as the concaves extending in the longitudinal direction of the body are provided on the boundaries between the middle covers and the erect walls, the force to hold the occupant's body can be secured by providing the concaves matching the occupant's ankles or the like while restraining interference with swelling parts such as the occupant's ankles.

Further, as the erect walls are disposed farther out than the middle covers in the vehicle width direction, the freedom of arranging the occupant's legs can be enhanced.

Further, as the bent parts are provided underneath the forward inclined part with a second bent part that becomes convex toward the rear in a side view, and the second bent part is closer to the downwardly extending part than the step floors near the second bent part. Thus, the legs can be placed with the second bent part as the fulcrum thereby to enhance the strength of the erect walls in this region. In addition, the erect walls before and behind the legs may be formed large and, even if the legs are swung with the second bent part as the fulcrum, the foot contact can be secured by the erect walls.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
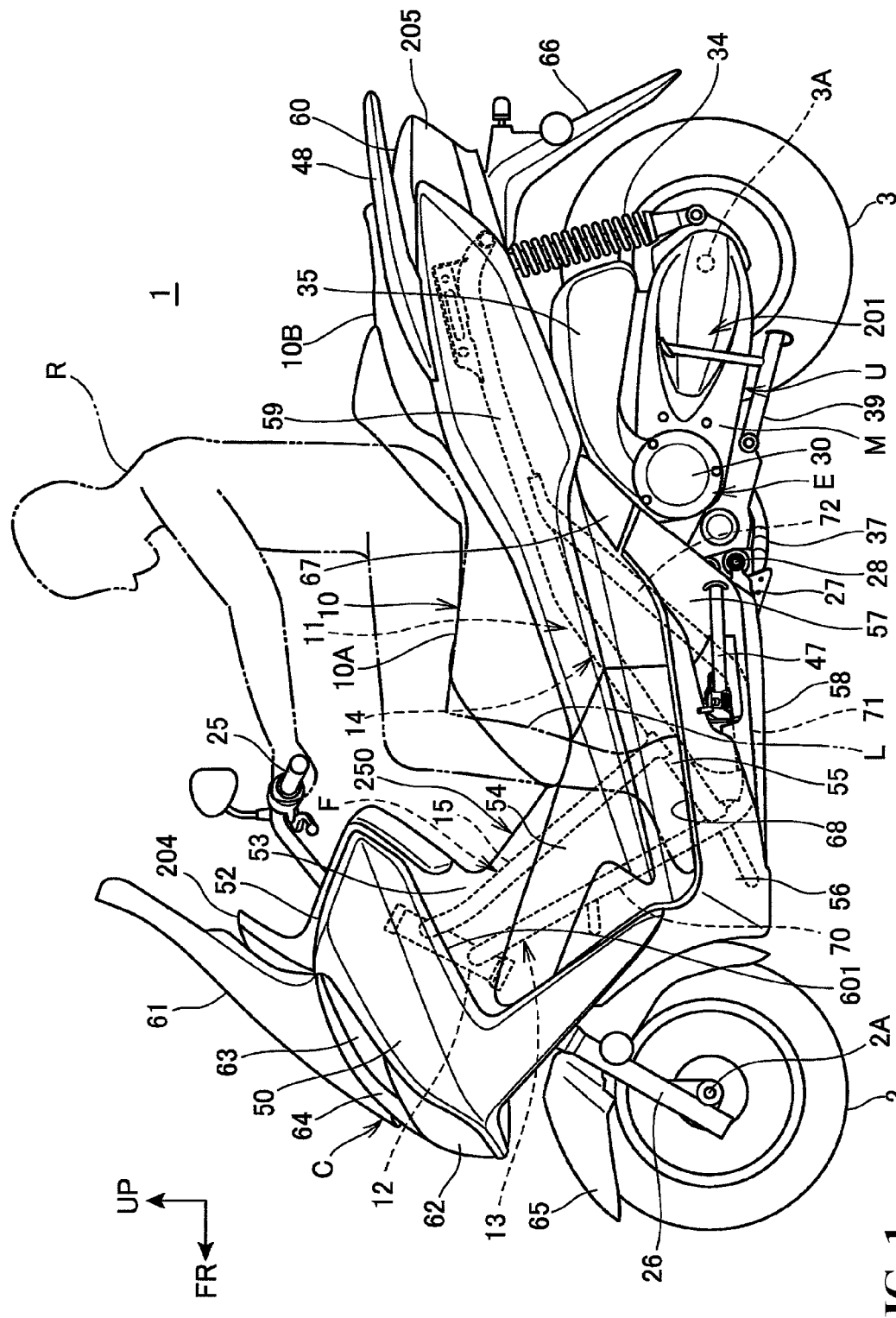
FIG. 1 is a left side view showing a motorcycle to which one embodiment of the present invention is applied.

One embodiment of the present invention will be described below with reference to the drawings. It is to be noted that, throughout the description, references to directions, such as front, rear, left, right, upward, and downward, are made with reference to the vehicle body, unless otherwise stated. It is also to be noted that, in the drawings, reference sign FR denotes the front of the vehicle body, reference sign UP denotes the upper side of the vehicle body, and reference sign LE denotes the left of the vehicle body.

FIG. 1 is a left side view showing a motorcycle 1 wherein one embodiment of the invention is applied.

The motorcycle 1 (saddle-ride type vehicle) is a scooter type vehicle having low-level step floors 68 and 68 on the two sides (only sign 68 toward the viewer's side is shown) on which an occupant R sitting on a seat 10 can set his or her legs L, has a front wheel 2 on the front portion of a body frame F. A rear wheel 3, which is the driving wheel, is journaled to a unit swing engine U (unit swing power unit) arranged in the rear portion of the vehicle. The body frame F is shielded by a resin-made body cover C.

A steering system for steering the front wheel 2 has a steering shaft rotatably journaled to a head pipe 12 constituting the front end part of the body frame F and a handlebar 25 linked to the upper part of the steering shaft. The lower end of the steering shaft is linked to a pair of left and right front forks 26 and 26 (only sign 26 toward the viewer's side is shown). The front wheel 2 is journaled to an axle 2A disposed at the lower ends of the front forks 26 and 26 and steered by operating the handlebar 25.

The unit swing engine U is a unit swing system integrating an engine E and a transmission case M housing a belt type continuously variable transmission 201, and also has a function of a swing arm to support the rear wheel 3. The unit swing engine U is linked to the body frame F via a linking member 27 linked to the front part of the engine, and is vertically swingable around a pivot shaft 28 disposed on the linking member 27.

The engine E is a water-cooled four stroke single cylinder engine, so arranged that the cylinder axis extends forward substantially horizontally. The engine E is configured by coupling a cylinder and a cylinder head with the front face of a crankcase 30 arranged ahead of the unit swing engine U. An exhaust pipe 37 is connected to an exhaust port in the under face of the cylinder head and extends rearwardly underneath the engine E and is connected to a muffler fixed to an external side face of an arm part to be described afterwards.

The transmission case M extends rearwardly from behind the crankcase 30 past the left side of the rear wheel 3. An arm part extending rearwardly past the right side of the rear wheel 3 is disposed behind the crankcase 30. The rear wheel 3 is supported by an axle 3A provided between the rear part of the transmission case M and the rear part of the arm part. The output of the engine E is transmitted to the rear wheel 3 by the continuously variable transmission 201. A rear suspension 34 each spans between the rear end of the transmission case M and the rear end of the arm part and between the same and the rear upper part of the body frame F. An air cleaner box 35 that takes in atmospheric air is provided on the upper face of the transmission case M.

The air cleaner box 35 is connected to a throttle body connected to an intake port in the upper face of the cylinder head by a connecting tube, not shown.

A main stand 39 that can support the vehicle in an upright state is disposed underneath the rear part of the transmission case M. A side stand 47 is provided.

The seats 10 openably block an opening bored over the full length of the upper face of a luggage box arranged underneath the sheet, and has a front seat 10A for the rider to sit on and a rear seat 10B formed a step higher than the seat 10A for the pillion passenger to sit on.

Grab rails 48 are fixed to the rear parts of a pair of left and right seat rails 14 and 14 (only sign 14 toward the viewer's side is shown) that constitute the body frame F behind a luggage box.

The body cover C has a front cover 50 that shields the front and left and right sides of the head pipe 12, a front lower cover (not shown) that is linked to the lower part of the front cover 50 to be positioned behind the front wheel 2 and an upper cover 52 linked to the upper part of the front cover 50 underneath the handlebar 25. An inner cover 53 is linked to the left and right edges of the front cover 50 with a pair of left and right middle covers 54 and 54 (only sign 54 toward the viewer's side is shown) linked to the lower edge of the inner cover 53. A pair of left and right erect walls 55 and 55 (only sign 55 toward the viewer's side is shown) are linked to the lower end of the front cover 50 and to the lower edges of the middle covers 54 and 54 with a pair of left and right front floor skirts 56 and 56 (only sign 56 toward the viewer's side is shown) linked to the lower part of the front cover 50 and to the lower parts of the erect walls 55 and 55. A pair of left and right rear floor skirts 57 and 57 (only sign 57 toward the viewer's side is shown) extend rearwardly continuous from front floor skirts 56 and 56 with an under cover 58 shielding the lower part of the body. A pair of left and right body side covers 59 and 59 (only sign 59 toward the viewer's side is shown) are linked to the middle covers 54 and 54 and the rear parts of the erect walls 55 and 55 with a tail cover 60 linked to the rear parts of the body side covers 59 and 59.

At the bottom of each of the left and right erect walls 55 and 55, the step floor 68 on which the driver sitting on the front seat 10A places his or her leg on is formed.

The inner cover 53, the middle covers 54 and 54, and the erect walls 55 and 55 are parts that form a center tunnel part 250 arranged underneath the space between the handlebar 25 and the seats 10.

The inner cover 53 is a component in which left and right leg shields 601 and 601 (only sign 601 toward the viewer's side is shown) that cover the legs L of the occupant R from the front are formed.

A wind screen 61 that extends toward the upper rear to shield the rider from winds is provided in the front part of the front cover 50. At the front end of the front cover 50, a pair of left and right headlights 62 and 62 (only sign 62 toward the viewer's side is shown) are provided. In addition, a pair of left and right winkers 63 and 63 (only sign 63 toward the viewer's side is shown) are disposed to be continuous to the upper parts of the headlights 62 and 62. A plate-shaped garnish 64 (constituting a part of the front cover 50) is provided between the headlights 62 and 62 and the wind screen 61.

The front forks 26 and 26 are provided with a front fender 65 that shields the front wheel 2 from above. A rear fender 66 that shields the rear wheel 3 from above is provided underneath the body side covers 59 and 59.

A pair of left and right collapsible tandem steps 67 and 67 (only sign 67 toward the viewer's side is shown) on which a pillion passenger sitting on the rear seat 10B places his or her legs are supported by the body frame F via stays.

A meter visor 204 (a part constituting the front cover 50) that enhances the visibility of meters by covering from the front the meters disposed ahead of the handlebar 25 is provided behind the wind screen 61. A rear combination lamp 205 is provided.

The body frame F is formed by linking a plurality of metal-made tubes or pipes by welding. A main frame 11 has the head pipe 12 disposed in the front part with a pair of left and right down frames 13 and 13 (only sign 13 toward the viewer's side is shown) extending rearwardly substantially horizontally and extending to the rear upwardly in the rear part after having extended to the rear downwardly from the head pipe 12. The pair of left and right seat rails 14 and 14 (only sign 14 toward the viewer's side is shown) extend to the rear upwardly from the lower parts of the down frames 13 and 13 as far as to the rear part of the vehicle, and a pair of left and right upper frames 15 and 15 (only sign 15 toward the viewer's side is shown) extending to the rear downwardly above the down frames 13 and 13 from the head pipe 12 and linked to the seat rails 14 and 14.

Each of the down frames 13 and 13 has a downwardly extending part 70 extending to the rear downwardly with its front end linked to the head pipe 12, a horizontally extending part 71 extending rearwardly and substantially horizontally from the lower end of the downwardly extending part 70, and an obliquely upward extending part 72 that extends to the rear upwardly from the rear end of the horizontally extending part 71.

Further, the main frame 11 is provided with a plurality of cross members (not shown) that link the left and right frames.

Figure 2:
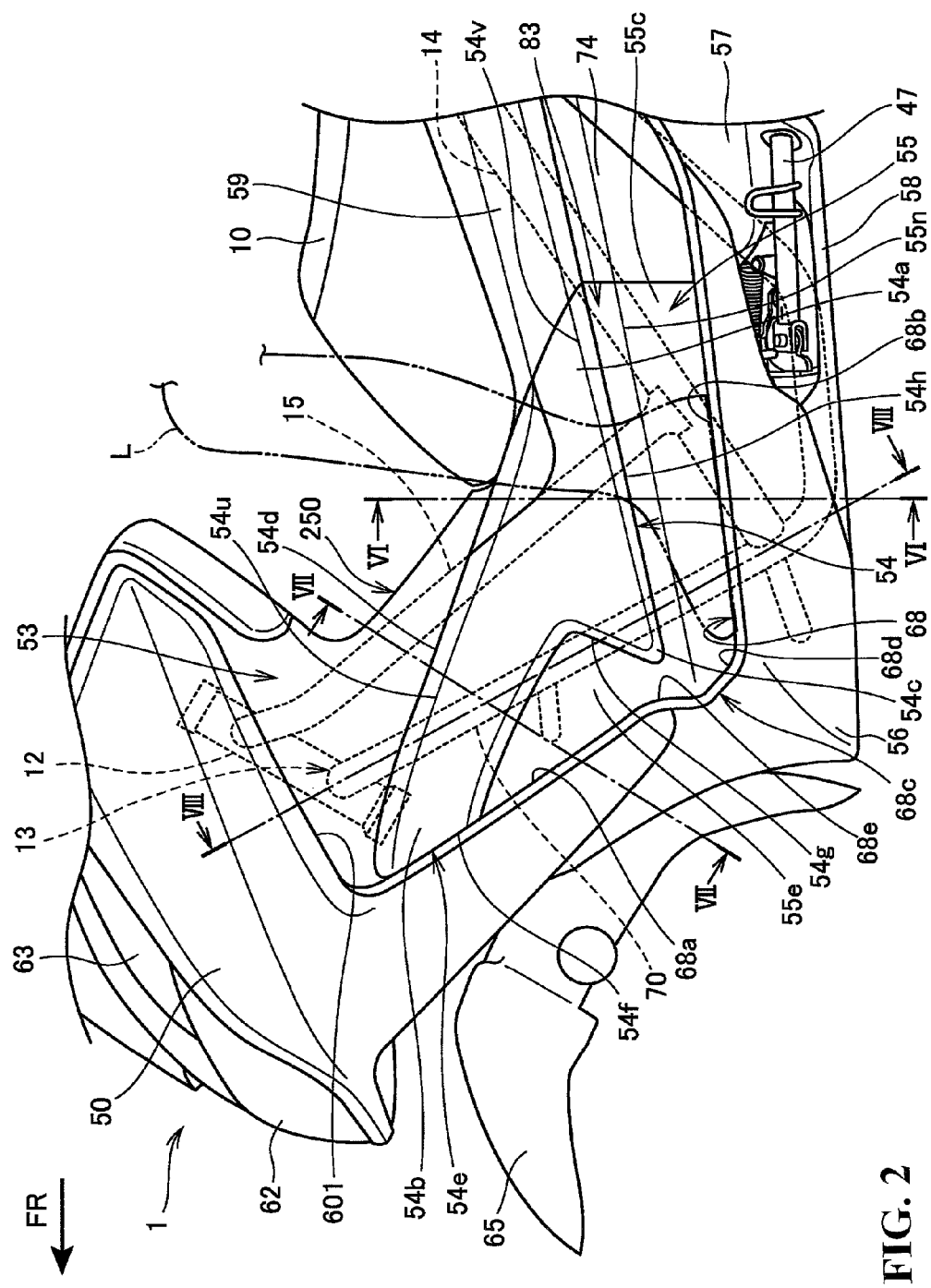
FIG. 2 is a left side view showing the essential parts of the motorcycle.

FIG. 2 is a left side view showing the essential parts of the motorcycle 1.

Each of the middle covers 54 and 54 (only sign 54 toward the viewer's side is shown) constituting the left and right side walls of the center tunnel part 250 is configured of a cover rear part 54a provided toward the rear of the body, a forward extending part 54b extending obliquely upwardly toward the front part of the body from the cover rear part 54a, and a downwardly extending part 54c extending obliquely downwardly toward the front part of the body in a tapering shape from the cover rear part 54a.

The upper edge 54d of the middle cover 54 is formed so as to become higher in the front part substantially linearly; the front edge 54e is formed of a substantially linear front end part 54f formed on the forward extending part 54b, and a dented part 54g having a shape recessed toward the rear part of the body in a V shape so as to be continuous to the lower end of the front end part 54f; and the lower edge 54h is formed to become higher in the rear part substantially linearly.

The middle cover 54 is arranged so as to overlap, in a side view, the downwardly extending part 70 of the down frame 13 and the upper frame 15 both extending to the rear obliquely downwardly from the head pipe 12.

Ridgelines 54u and 54v are formed on the surfaces of middle covers 54. Ridgelines 55n are formed on the surface of the erect walls 55. Between the ridgelines 54v of the middle covers 54 and the ridgelines 55n of the erect walls 55, there are formed side concaves 83 to be described in detail afterwards.

Each of the step floors 68 is configured of a forward inclined part 68a disposed in its forward part in a forward rising shape and a horizontal part 68b disposed either substantially horizontally or in a rearwardly rising shape behind the forward inclined part 68a, and bent parts 68c connecting each of these forward inclined part 68a and horizontal part 68b.

The bent part 68c consists of a first bent part 68d that is formed continuous from the front end of the horizontal part 68b and curves convexly to the front obliquely downwardly and a second bent part 68e that is formed continuous between the first bent part 68d and the forward inclined part 68a and curves convexly to the rear obliquely upwardly. The tip of the downwardly extending part 54c of the middle cover 54 is close to the second bent part 68e. In further detail, the second bent part 68e is closer to the downwardly extending part 54c than the forward inclined part 68a and the first bent part 68d, which are in the vicinities of the second bent part 68e.

A maintenance lid 74 is disposed detachably behind the erect wall 55 and underneath a body side cover 59. By removing the maintenance lid 74, maintenance of the ignition plugs of the engine is made possible.

Figure 3:
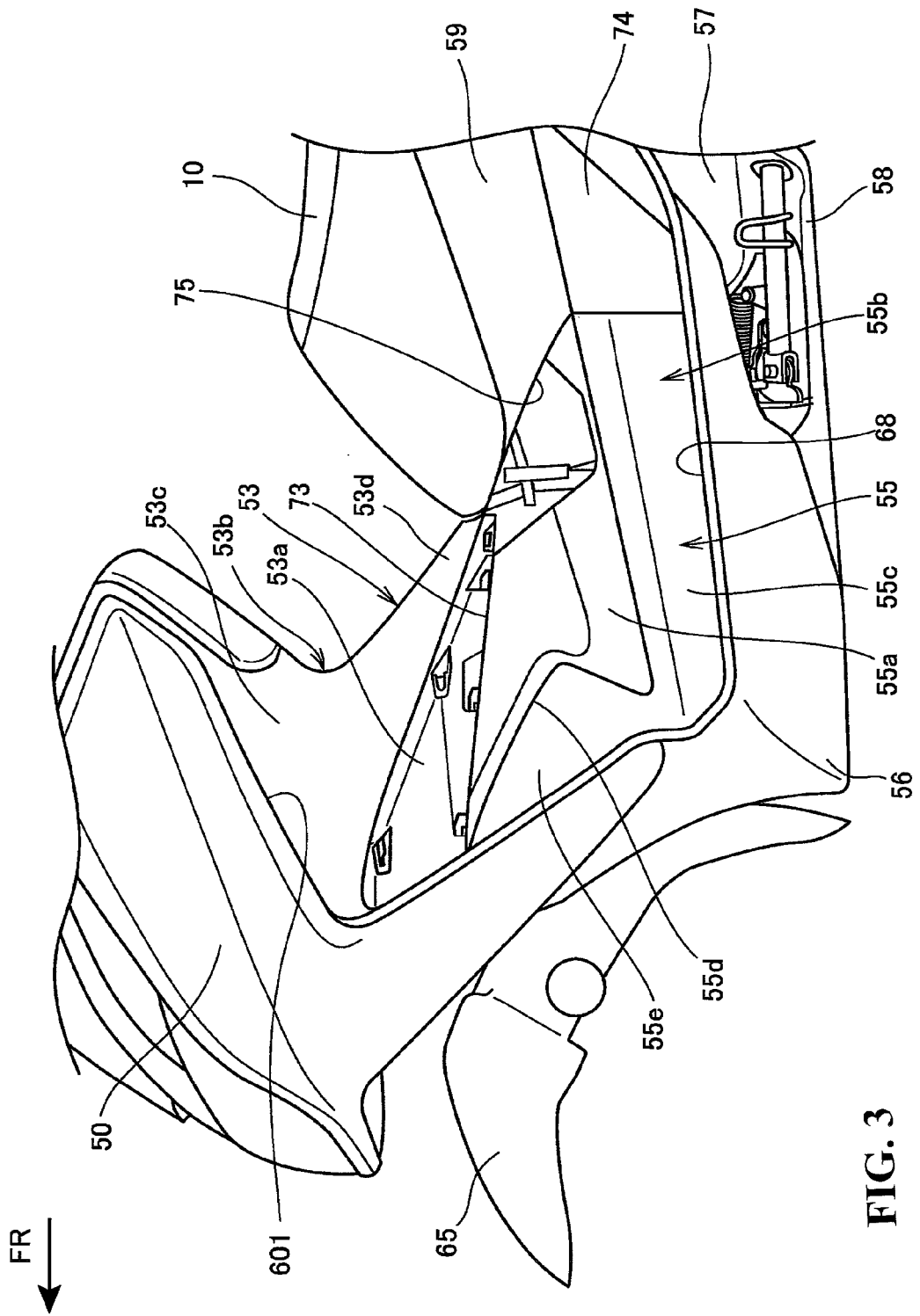
FIG. 3 is a left side view showing a state resulting from removal of the middle covers from the state of FIG. 2.

FIG. 3 is a left side view showing a state resulting from removal of the middle covers from the state of FIG. 2.

The inner cover 53 and the erect walls 55 are joined by a boundary part 73 extending in the longitudinal direction of the body.

The inner cover 53 consists of an inner cover part 53a arranged inside the middle covers 54 (see FIG. 2) in the vehicle width direction and overlaps the middle covers 54 and an outer cover part 53b arranged in a position where it does not overlap the middle covers 54. The inner cover part 53a has a plurality of engaged parts that are engaged with the middle covers 54 and the erect walls 55. The outer cover part 53b is provided with a cover upper part 53c that is linked to the left and right edge parts of the front cover 50 and whose surface faces downwardly. A cover central part 53d is arranged between the cover upper part 53c and the inner cover part 53a.

A portion of the cover upper part 53c and an inclined part 53h (see FIG. 4) of the inner cover 53 form a leg shield 601.

Each of the erect walls 55 is provided with an inner cover part 55a superposed over the middle cover 54 and an outer cover part 55b arranged in a position not to be superposed over the middle cover 54. An opening 75 for the weight reducing purpose is provided behind the inner cover part 55a in an upper position behind the outer cover part 55b and ahead of the body side cover 59.

The outer cover part 55b consists of a cover lower part 55c that is continuous to the lower edge of the inner cover part 55a and extends upward from the inner side end part of the step floors 68 in the vehicle width direction and a substantially triangular cover front part 55e that adjoins a front edge 55d recessed in a V shape toward the rear part of the body in the inner cover part 55a and extends upwardly from the front end part of the cover lower part 55c. The cover lower part 55c, as shown in FIG. 2, is a portion having a height substantially overlapping, in a side view, the foot (the part beyond the ankle) of the leg L placed on the step floor 68.

Figure 4:
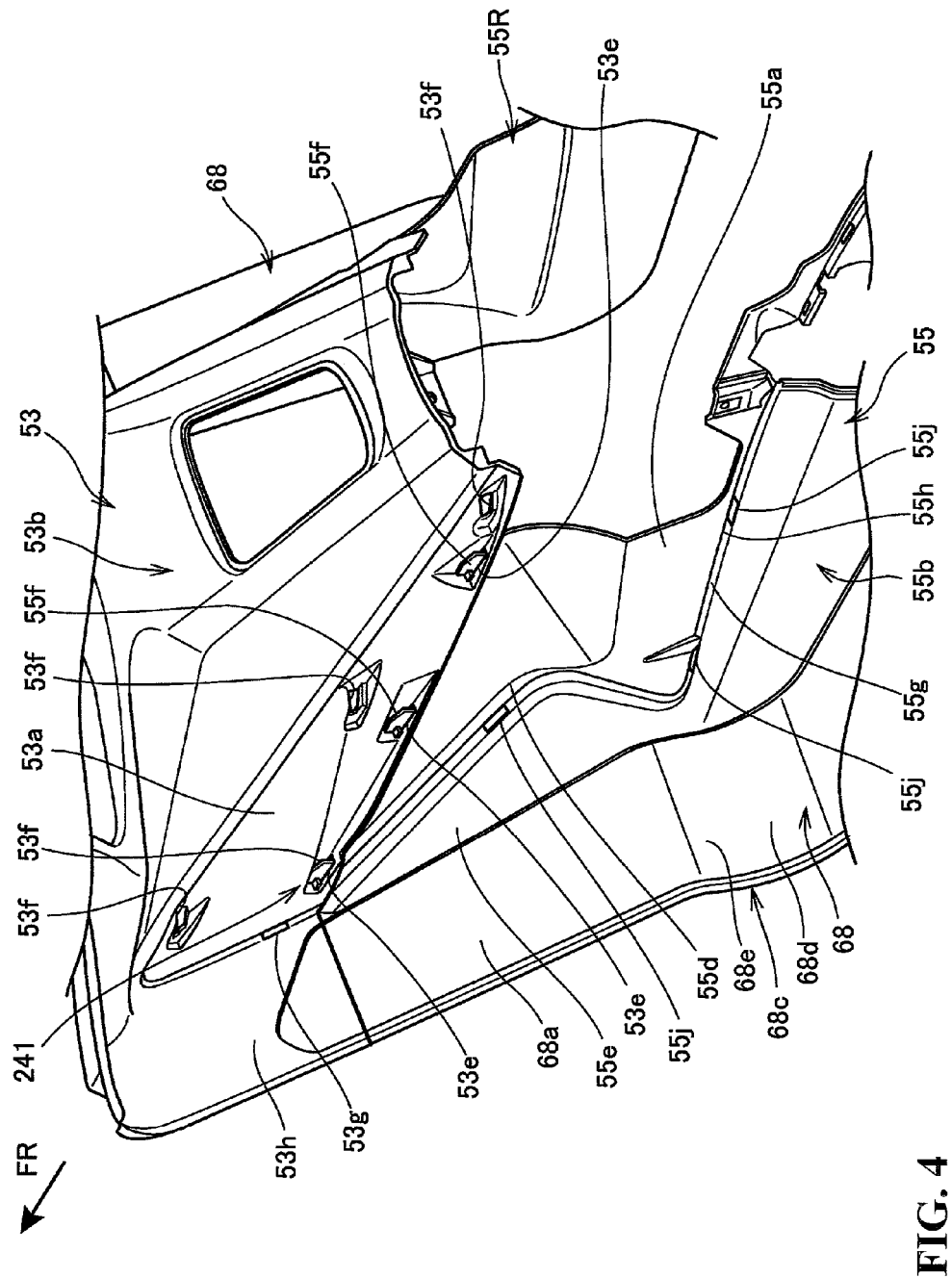
FIG. 4 is a perspective view showing the state of connection of the inner cover and the erect wall.

FIG. 4 is a perspective view showing the state of connection of the inner cover 53 and the erect wall 55 in a state in which the middle cover 54 (see FIG. 2) is removed.

A plurality of lower engaged holes 53e to be engaged with the erect wall 55 are formed in the inner cover 53 near the lower edge of the inner cover part 53a.

The erect wall 55 has a plurality of key-shaped engaging parts 55f formed in a key shape on the upper edge the inner cover part 55a, and the plurality of these key-shaped engaging parts 55f engage with the respective counterparts of the plurality of lower engaged holes 53e of the inner cover 53. These plurality of lower engaged holes 53e and plurality of key-shaped engaging parts 55f, that are engaging parts for the inner cover 53 and the erect wall 55, constitute a first engaging part 241.

The erect wall 55 is provided with a stepped part 55g in the boundary part between the inner cover part 55a and the outer cover part 55b. In more detail, the stepped part 55g is disposed so as to run along the front edge 55d and the lower edge 55h of the inner cover part 55a. Further, as illustrated in FIG. 2 and FIG. 4, the stepped part 55g is disposed so as to run along the dented part 54g and the lower edge 54h of the middle cover 54. The dented part 54g and the lower edge 54h of the middle cover 54 are brought into contact with and fitted to the stepped part 55g.

Further, so that the middle cover 54 can be engaged with it, the inner cover 53 has a plurality of upper engaged holes 53f formed near the upper edge of the inner cover part 53a and a slit 53g formed near the front edge of the inner cover part 53a (in more detail, the corner between the inner cover part 53a and the inclined part 53h to be described afterwards), while the erect wall 55 has a plurality of slits 55j formed in the stepped part 55g. Engaging parts on the middle cover 54 to engage with these upper engaged holes 53f and slits 53g and 55j will be described in detail afterwards.

The step floor 68 is so connected that its forward inclined part 68a extends ahead obliquely upward to the height of the upper end of the cover front part 55e of the erect wall 55 and the inclined part 53h constituting the outer cover part 53b of the inner cover 53 is continuous to the front end of the forward inclined part 68a to become higher in the forward part. Namely, the step floor 68 is separate from the inner cover part 53a of the inner cover 53 and the inner cover part 55a of the erect wall 55.

Figure 5:
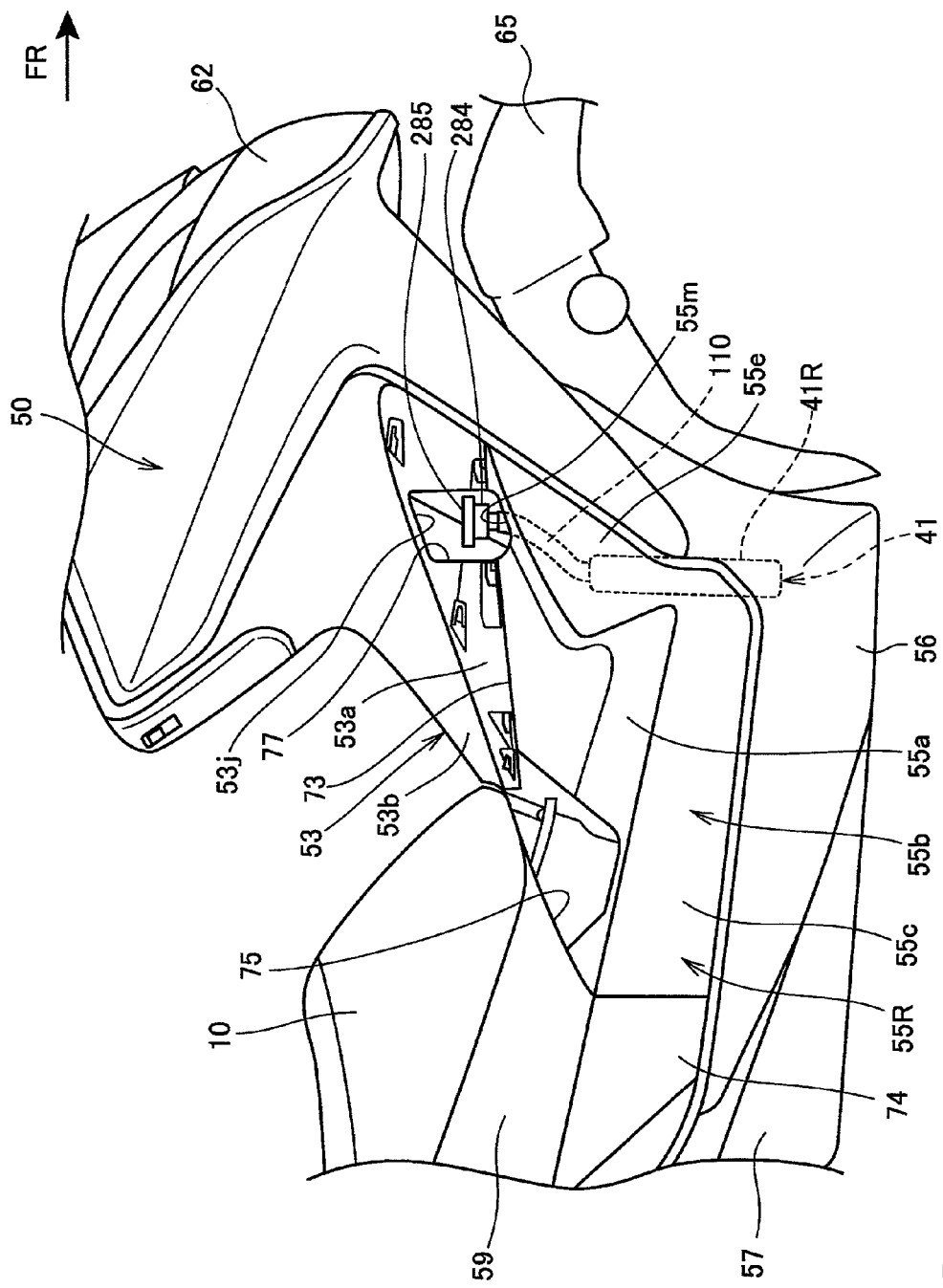
FIG. 5 is a right side view showing a state in which the right side middle cover is removed.

FIG. 5 is a right side view showing a state in which the right side middle cover is removed.

In the inner cover 53 and the erect wall 55R (the different reference sign is used to distinguish the one from the left side erect wall 55), a maintenance purpose opening 77 is formed. This maintenance purpose opening 77 is a part used for feeding water through a water feed port 284 for a radiator 41, and the water feed port 284 is fitted to a right tank part 41R of the radiator 41 via a water feed pipe 110. A radiator cap 285 is provided.

The maintenance purpose opening 77 is composed of an opening purpose upper dented part 53j formed in the lower part of the inner cover 53 and an opening purpose lower dented part 53m formed in the upper part of the erect wall 55R, and the maintenance purpose opening 77 is usually covered by the middle cover 54 (see FIG. 2).

Figure 6:
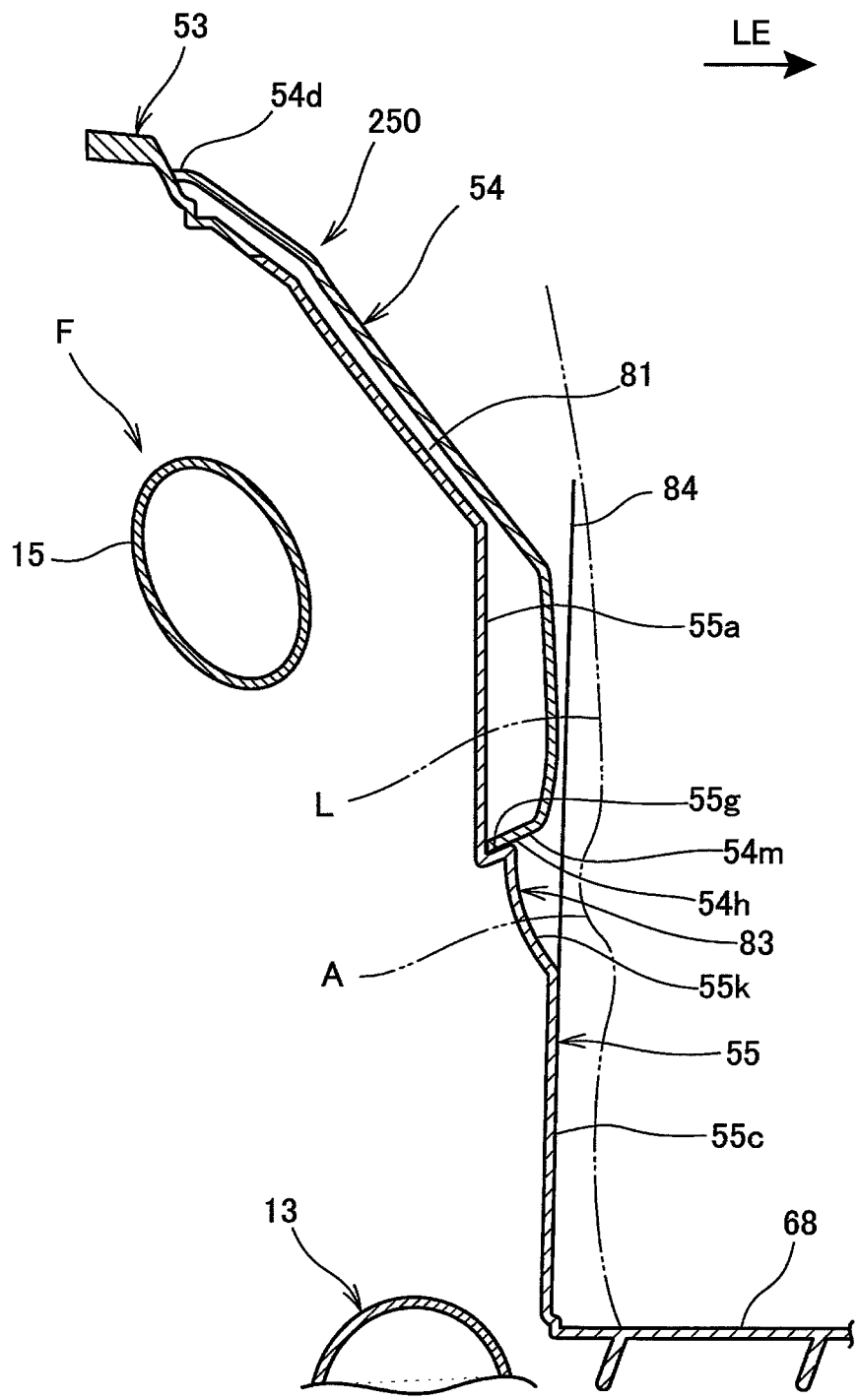
FIG. 6 is a sectional view taken along line VI-VI in FIG. 2.

FIG. 6 is a sectional view taken along line VI-VI in FIG. 2.

The step floors 68 are erected from and integrally with the erect wall 55; the lower edge 54h of the middle cover 54 is kept in contact with the stepped part 55g formed on the boundary part of each of the cover lower part 55c and the inner cover part 55a of the erect wall 55; and the upper edge 54d of the middle cover 54 is kept in contact with the inner cover part 53a of the inner cover 53. As a result, a gap 81 is formed between the inner cover 53 and the erect wall 55 on the one hand and the middle cover 54 on the other to cause the inner cover 53, the erect wall 55, and the middle cover 54 to form a box structure, and accordingly the rigidity of the middle cover 54 can be enhanced thereby to enable the rigidity of the center tunnel part 250 to be enhanced.

Further, a curved part 55k that is concave inward and extends in the longitudinal direction of the body is disposed in the cover lower part 55c of the erect wall 55; a lower end inclined part 54m is formed in the middle cover 54 extending in the longitudinal direction of the body so as to contain in its lower part the lower edge 54h; and these curved part 55k and lower end inclined part 54m constitute the side concave 83 extending in the longitudinal direction of the body. Formation of the side concave 83 in the center tunnel part 250 in this way makes possible retraining of interference between the occupant's leg L, especially its ankle A protruded in the vehicle width direction, placed on the step floor 68 and the center tunnel part 250 thereby to enhance riding comfort.

When an extended straight line 84 that comes into contact with the surface of the erect wall 55 is drawn, the extended straight line 84 is arranged farther out than the middle cover 54 in the vehicle width direction. Namely, the erect wall 55 has its surface farther out than the middle covers 54 in the vehicle width direction. This results in a greater gap between the middle cover 54 and the leg L, enabling the freedom of arrangement of the leg L to be increased.

Figure 7:
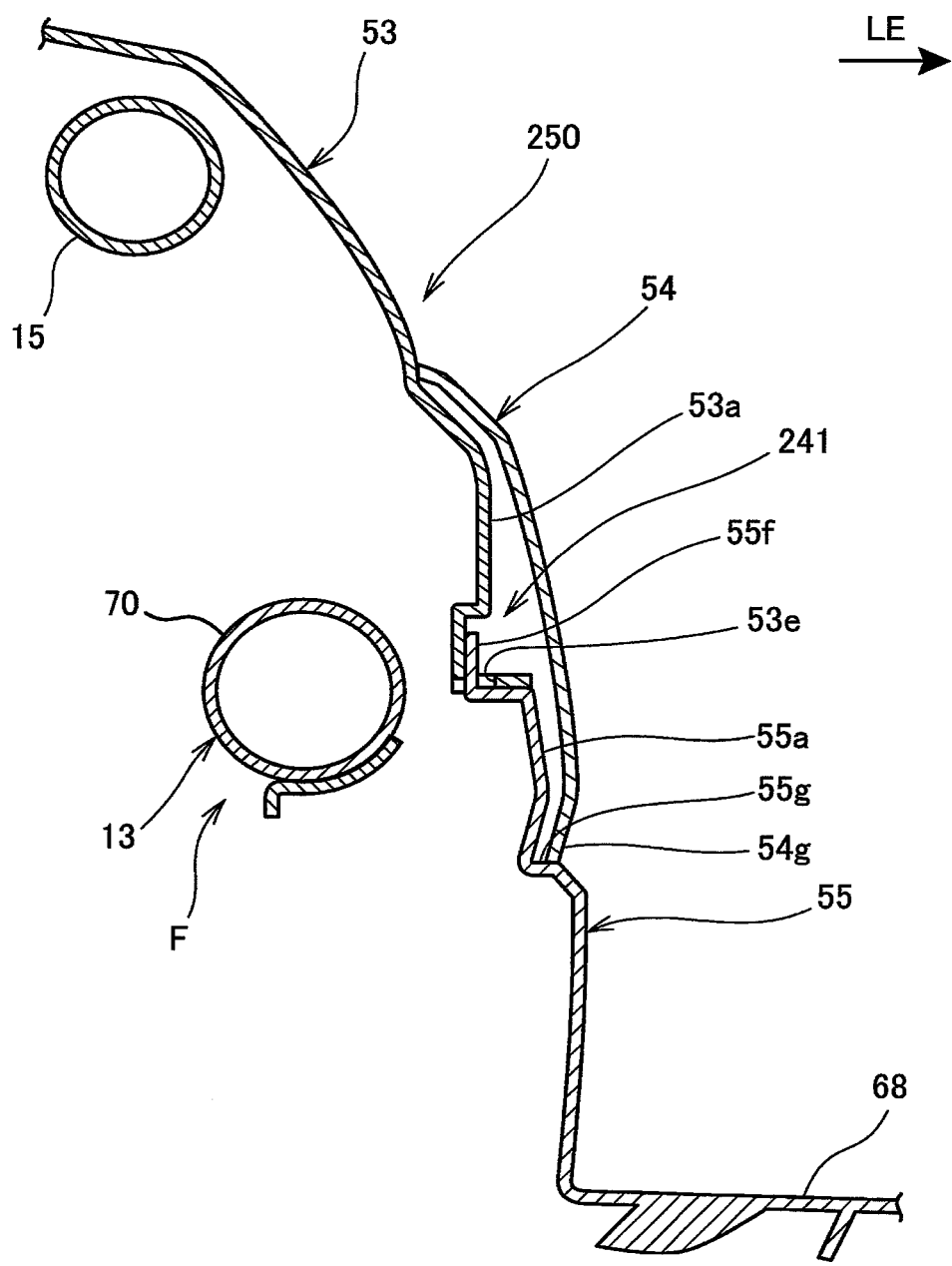
FIG. 7 is a sectional view taken along line VII-VII in FIG. 2.

FIG. 7 is a sectional view taken along line VII-VII in FIG. 2.

The lower engaged hole 53e is formed near the lower edge of the inner cover part 53a of the inner cover 53; the key-shaped engaging part 55f is formed on the upper edge of the inner cover part 55a of the erect wall 55; the key-shaped engaging part 55f engages with the lower engaged holes 53e; and the first engaging part 241, which is the engaging part of the inner cover 53 and the erect wall 55, is externally shielded by the middle cover 54 sideways. The inner cover 53, the erect wall 55, and the middle cover 54 are formed in a shape having a box-like section. Thus, the rigidity of the center tunnel part 250 can be enhanced. As the bend of the side walls of the center tunnel part 250 can be thereby restrained, even if the clearance between the center tunnel part 250 and the body frame F, or the clearance from the downwardly extending part 70 of the down frame 13 and the upper frame 15, is narrowed, interference can be restrained.

Figure 8:
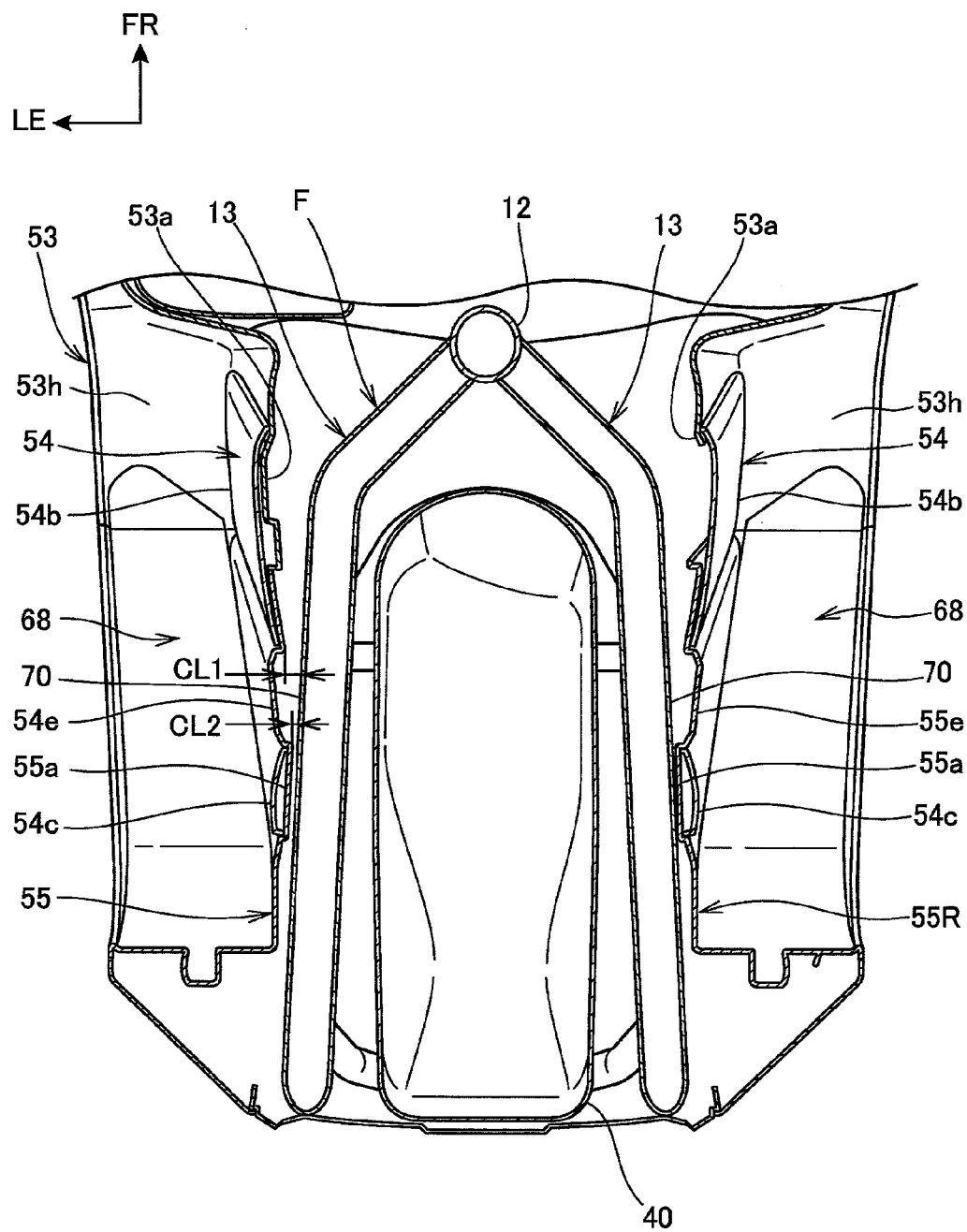
FIG. 8 is a sectional view taken along line VIII-VIII in FIG. 2.

FIG. 8 is a sectional view taken along line in FIG. 2, and shows a section along the downwardly extending part 70 of the down frame 13 constituting the body frame F.

The inner cover parts 53a of the inner covers 53 and the inner cover parts 55a of the erect walls 55 corresponding to the forward extending parts 54b and the downwardly extending parts 54c of the middle covers 54 are arranged close to the left and right downwardly extending parts 70. With the gaps between the downwardly extending parts 70 and the inner cover 53 and the inner cover parts 53a being represented by CL1 and the gaps between the downwardly extending parts 70 and the inner cover parts 55a of the erect walls 55 being represented by CL2, a relationship of CL1>CL2 holds. A fuel tank 40 is arranged between the left and right down frames 13 and 13.

Figure 9:
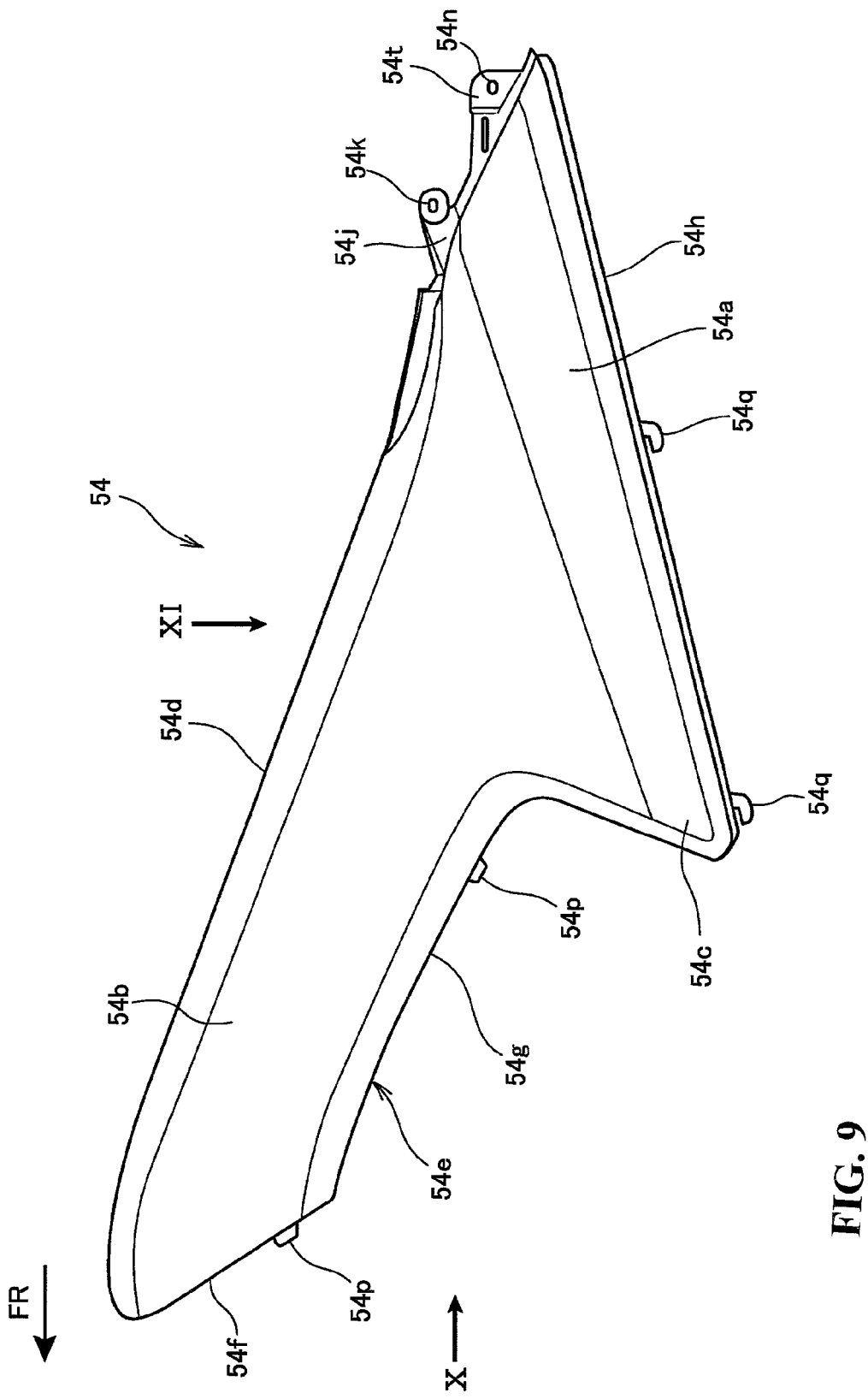
FIG. 9 is a side view showing one of the middle covers.

FIG. 9 is a side view showing one of the middle covers 54.

The middle cover 54 is provided in the rear part of the upper edge 54d, a luggage box fastening part 54j for fastening with a screw on the luggage box, a screw insertion hole 54k bored in the luggage box fastening part 54j, a body frame fastening part 54t for fastening with a screw on the body frame side, and a screw insertion hole 54n bored in the body frame fastening part 54t; one projecting part 54p is provided on each of the front end part 54f and the dented part 54g; and a plurality of key-shaped engaging parts 54q shaped like a key are provided on the lower edge 54h.

Figure 10:
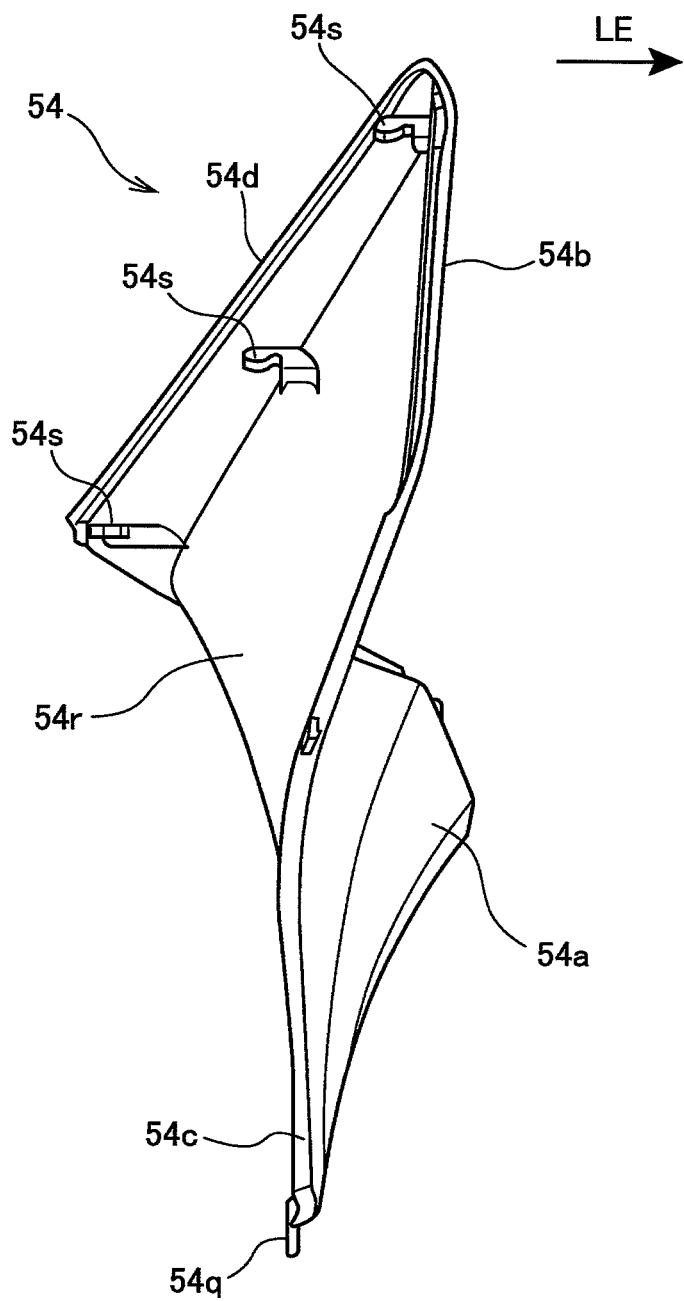
FIG. 10 is a view as seen along arrow X in FIG. 9.
Figure 11:
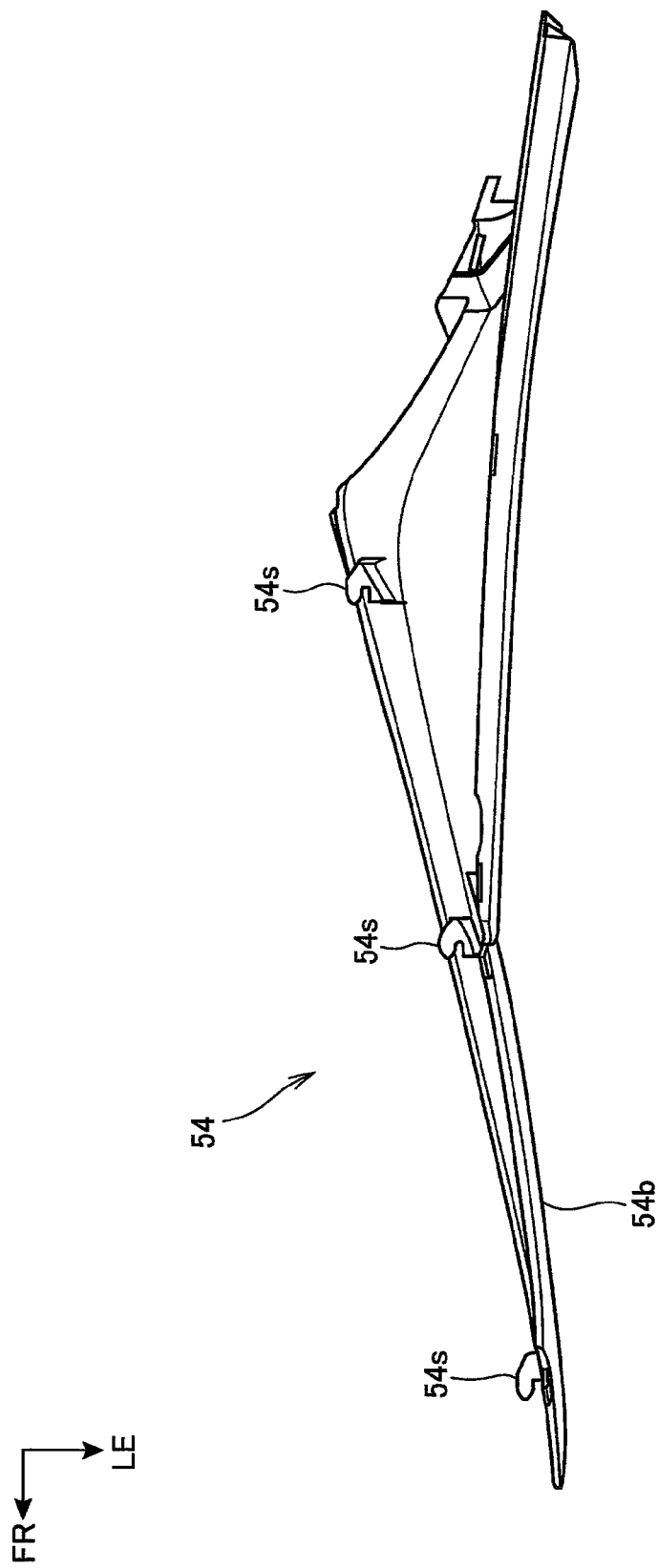
FIG. 11 is a view as seen along arrow XI in FIG. 9.

FIG. 10 is a view as seen along arrow X in FIG. 9, and FIG. 11 is a view as seen along arrow XI in FIG. 9.

As shown in FIG. 10, the middle cover 54 is provided in the upper part of the rear face 54r a with a plurality (e.g. in three positions) of inner key-shaped engaging parts 54s shaped like a key so as to run along the upper edge 54d.

As shown in FIG. 11, the middle cover 54 has a shape so slimmed that its central part in the longitudinal direction of the body enters deeper inside in the body width direction than the front end and the rear end. This slimmed shape can increase riding comfort by restraining interference between the occupant's leg and the middle cover 54.

Figure 12:
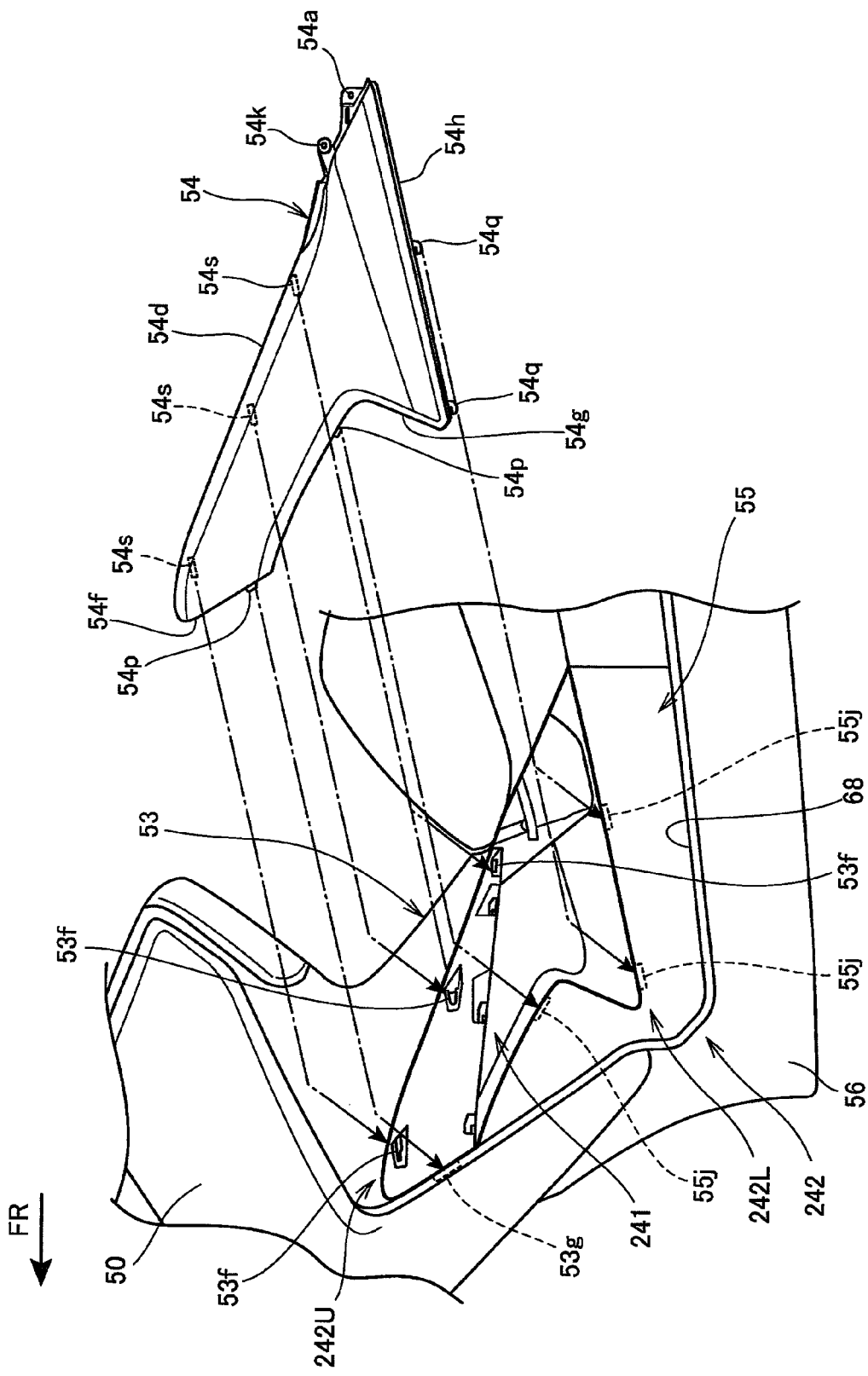
FIG. 12 is an action diagram illustrating fitting of the inner cover and the erect wall to one of the middle covers.

FIG. 12 is an action diagram illustrating fitting of the inner cover 53 and the erect wall 55 to the middle cover 54.

The middle cover 54 is fitted from behind the body to the inner cover 53 and the erect wall 55 already fitted to the body. In more detail, the plurality of inner key-shaped engaging parts 54s disposed in the upper part of the middle cover 54 and the plurality of key-shaped engaging parts 54q disposed in the lower part of the middle cover 54 are respectively engaged into the plurality of the upper engaged holes 53f in the inner cover 53 and the plurality of slits 55j in the erect wall 55, and at the same time, the plurality of projecting parts 54p of the middle cover 54 are inserted into the slit 53g in the inner cover 53 and the slits 55j in the erect wall 55. Then a screw is put into the screw insertion hole 54k in the middle cover 54 to screw it toward the luggage box and, at the same time, a screw is put into the screw insertion hole 54*n* to screw it toward the body frame. This completes fitting-in of the middle cover 54.

The plurality of the upper engaged holes 53*f*, the slit 53*g*, the plurality of inner key-shaped engaging parts 54*s*, and the projecting parts 54*p*, which are the engaging parts of the inner cover 53 and the middle cover 54, constitute an upper second engaging part 242U. Further, the plurality of slits 55*j*, the projecting parts 54*p*, and the plurality of key-shaped engaging parts 54*q*, which are the engaging parts of the erect wall 55 and the middle cover 54, constitute a lower second engaging part 242L. These upper second engaging part 242U and lower second engaging part 242L constitute the second engaging parts 242, and the second engaging parts 242 are arranged so as to stride over the first engaging part 241.

Figure 13:
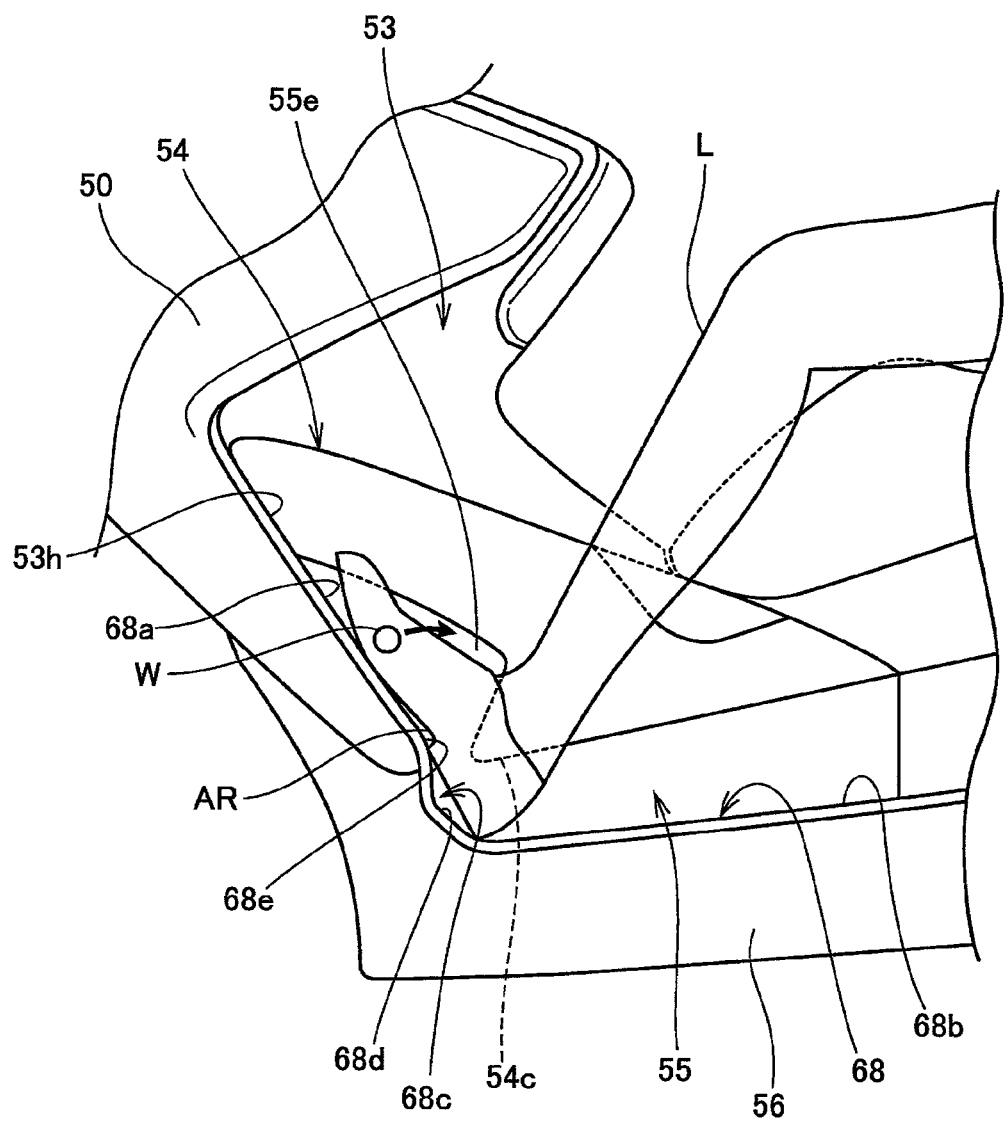
FIG. 13 is an action diagram illustrating an action in a state in which the occupant's leg is placed on the forward inclined part and the bent parts of the step floors.

FIG. 13 is an action diagram illustrating an action in a state in which the occupant's leg L is placed on the forward inclined part 68*a* and the bent part 68*c*.

In a state in which the leg L is so placed on the step floor 68 that a shoe sole AR matching the foot arch of the occupant's leg L is arranged on the second bent part 68*e* of the step floor 68, if the widest part W of the leg L (where the width between the foot of the first toe and that of the fifth toe is the greatest) is represented by a circle, the inner side face of the widest part W corresponds to the cover front part 55*e* of the erect wall 55. As the lower part of the substantially triangular cover front part 55*e* manifests a substantially fan shape whose lower end extends from the second bent part 68*e* to the downwardly extending part 54*c* of the middle cover 54, even if the leg L is swung as indicated by the arrow with the second bent part 68*e* as the fulcrum, the widest part W of the leg L is positioned on an external flank of the cover front part 55*e*. Accordingly, the leg L can be held in contact with the cover front part 55*e*, thereby enabling the foot contact to be secured.

In the body cover structure of the motorcycle 1 as a saddle-ride type vehicle wherein, as shown in FIG. 1 and FIG. 2 above, the center tunnel part 250 is provided between the seat 10 on which the occupant R sits and the leg shield 601 covering the front part of the body, the step floors 68 on which the occupant R places his or her legs L are provided so as to extend in the longitudinal direction on the left and right sides of the center tunnel part 250, and the center tunnel part 250 is configured of the inner cover 53 constituting the leg shield 601. The erect walls 55 extend from the inner side end parts of the step floors 68 in the vehicle width direction, and the middle covers 54 are arranged to be long in the longitudinal direction so as to stride over the inner covers 53 and the erect walls 55. The step floors 68 are formed of the forward inclined parts 68*a* provided ahead of them in a forward rising shape with the horizontal parts 68*b* being disposed either substantially horizontally or in a rearward rising shape behind these forward inclined parts 68*a*. The bent parts 68*c* connect the forward inclined parts 68*a* and the horizontal parts 68*b*. The middle covers 54 are provided in their lower parts with the downwardly extending parts 54*c* extending toward the bent parts 68*c*.

In this configuration, the area of the middle covers 54 is expanded by providing the middle covers 54 with the downwardly extending parts 54*c* with the result that it is made possible, when the center tunnel part 250 is formed of the middle covers 54 and the erect walls 55, to increase contact positions and joining positions thereby to enhance the rigidity of the middle covers 54. Accordingly, the rigidity of the center tunnel part 250 is enhanced.

Moreover, as the downwardly extending parts 54*c* extend toward the bent parts 68*c* of the step floors 68, when the occupant takes a foot setting position in which the legs L are placed on the forward inclined parts 68*a* and the bent parts 68*c* and the tow side can be swung back and forth with the heel side as the fulcrum, as the downwardly extending parts 54*c* are in positions near the centers of foot swinging, the occupant's foot placing posture is not affected. Thus, the occupant can take a comfortable foot placing posture and enjoy enhanced riding comfort.

Further, the dented parts 54*g* having the dented parts 54*g* so recessed toward the rear part of the body are formed on the front edges of the middle covers 54 above the downwardly extending parts 54*c*. Accordingly, a large area can be secured for the erect walls 55 by the dented parts 54*g* when the legs L are placed on the forward inclined parts 68*a* of the step floors 68 even if the legs L are swung back, the legs L will not reach the dented parts 54*g*. Thus, it is possible to hold the legs L on and in contact with the erect walls 55, resulting in enhanced riding comfort.

Further, as shown in FIG. 2 and FIG. 4, since the front end parts 54*f* of the middle covers 54 are arranged higher than the forward inclined parts 68*a*, no boundary is formed by the front end parts 54*f* and the forward inclined parts 68*a* of the middle covers 54. Namely, no boundary is formed by the front end parts 54*f* of the middle covers 54 and the erect walls 55. For instance, if any boundary were formed between the front end parts 54*f* of the middle covers 54 and the erect walls 55, the boundary might affect actions such as swinging, in the longitudinal direction of the body, of the legs L placed on the forward inclined parts 68*a*, but in the embodiment no such action of the legs L would be affected. Thus, riding comfort is enhanced.

Further, as shown in FIG. 1 and FIG. 2, since the down frames 13 and the upper frames 15 arranged above these down frames 13 extend to the rear downwardly from the head pipe 12 constituting the front end part of the body frame F, and the down frames 13 and the forward extending parts 54*b* constituting the upper parts of the middle covers 54 and extending toward the front of the body are arranged so as to overlap each other in a side view, even though the down frames 13 are arranged near the high rigidity parts (namely the rigidity-augmented middle covers 54 or the rigidity-augmented side walls of the center tunnel part 250), since bending of covering members (the inner covers 53, the middle covers 54, and the erect walls 55) constituting the center tunnel part 250 due to body vibration or the like is small, the body frame F and the covering members (the inner cover 53, the middle cover 54, and the erect wall 55) can be arranged close to each other, thereby facilitating compact designing of the body.

Also, as shown in FIG. 2, FIG. 4, and FIG. 7, since the erect walls 55 are provided with the stepped parts 55*g* so as to run along the dented parts 54*g* of the middle covers 54 and the dented parts 54*g* of the middle covers 54 are brought into contact with and fitted to these stepped parts 55*g* and accordingly the front edges 54*e* of the middle covers 54 can be formed in a convexo-concave shape by the downwardly extending parts 54*c* and the dented parts 54*g*, the middle covers 54 can be easily positioned in the longitudinal and vertical directions by bringing them into contact with and fitting to the stepped parts 55*g*. The numbers of positions parts and of engaging parts for positioning the middle covers 54 can be reduced, and accordingly the shape of the middle covers 54, and eventually the shapes of the covering members around (the inner covers 53 and the erect walls 55) can be simplified.

Further, as shown in FIG. 4, FIG. 7, and FIG. 12, the first engaging part 241 with which the inner covers 53 and the erect walls 55 are engaged is provided inside the middle covers 54 are provided and the second engaging parts 242 with which the inner covers 53, the erect walls 55, and the middle covers 54 are engaged are provided at the upper and lower end parts of the middle covers 54 so as to sandwich the first engaging part 241 vertically. Thus, the number of fastening parts using bolts and nuts is kept to a minimum. In addition, various body covers (the inner covers 53, the middle covers 54, and the erect walls 55) can be firmly linked by engagement, enabling the cost and the number of fitting man-hours to be reduced.

Also, as shown in FIG. 2 and FIG. 6, since the side concaves 83 are provided on the boundaries between the middle covers 54 and the erect walls 55 as concaves extending in the longitudinal direction of the body, by providing the side concaves 83 matching the ankles A of the occupant's legs L, the force to hold the occupant's body can be secured by keeping the legs L, for instance the toes, in contact with the cover lower parts 55c of the erect walls 55 while restraining interference with swelling parts such as the occupant's ankles A.

Further, as shown in FIG. 6, since the erect walls 55 are disposed farther out in the vehicle width direction than the middle covers 54, the distance between the legs L placed on the step floors 68 positioned lower than the erect walls 55, for instance parts higher than the toes, and the middle covers 54 can be secured, resulting in greater freedom for arranging the legs L.

Also, as shown in FIG. 2 and FIG. 13, since the bent parts 68c are provided underneath the forward inclined parts 68a with the second bent parts 68e bending convexly rearwardly in a side view and these second bent parts 68e are closer to the downwardly extending parts 54c than the nearby step floors 68, the erect walls 55, in more detail the cover front parts 55e, between the second bent parts 68e and the downwardly extending parts 54 are increased in rigidity. Thus, the legs L can be placed to be swingable between the longitudinal direction of the body with the second bent parts 68e as the fulcrum. Furthermore, the width before and behind the cover front parts 55e positioned inside the legs L can be formed large wherein foot contact can be secured by the cover front parts 55e.

It should be understood that the embodiment described above illustrates only an aspect of the present invention, and various modifications and applications may be made as desired without deviating from the spirit of the invention.

Furthermore, the invention is not limited to application to the motorcycle 1, but can also be applied to saddle-ride type vehicles including non-motorcycles. It should be noted that examples of the saddle-ride type vehicle include vehicles in general on which the rider sits astride the vehicle body, and include not only motorcycles (not excluding motor-assisted bicycles) but also three-wheeled or four-wheeled vehicles classified as ATVs (all terrain vehicles).

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims

What is claimed is:

1. A body cover structure for saddle-ride type vehicles comprising:
   a center tunnel part provided between a seat and a leg shield covering a front part of a body; and
   step floors for placing legs of an occupant, said step floors being disposed on the two sides of the center tunnel part and extending in the longitudinal direction, the center tunnel part being configured of an inner cover extending rearwardly from the leg shield, erect walls extending upwardly from inner side end parts of the step floors in the vehicle width direction, and middle covers arranged to be long in the longitudinal direction so as to stride over the inner cover and the erect walls;
   wherein the step floors are configured of forward inclined parts disposed ahead thereof in a forward rising shape, horizontal parts disposed either substantially horizontally or in a rearwardly rising shape behind these forward inclined parts, and bent parts connecting the forward inclined parts and the horizontal parts; and
   the middle covers are provided on the lower edges thereof with downwardly extending parts extending toward the bent parts.

2. The body cover structure for saddle-ride type vehicles according to claim 1, wherein the middle covers have, formed on front edges thereof, dented parts recessed toward a rear part of the body above the downwardly extending parts.

3. The body cover structure for saddle-ride type vehicles according to claim 1, wherein front end parts of the middle covers are arranged in higher positions than the forward inclined parts.

4. The body cover structure for saddle-ride type vehicles according to claim 2, wherein front end parts of the middle covers are arranged in higher positions than the forward inclined parts.

5. The body cover structure for saddle-ride type vehicles according to claim 1, wherein down frames and upper frames arranged above the down frames extend rearwardly and downwardly from a head pipe constituting a front end part of a body frame, and the down frames and forward extending parts constituting upper parts of the middle covers and extending toward the front part of the body are arranged so as to overlap each other in a side view.

6. The body cover structure for saddle-ride type vehicles according to claim 2, wherein down frames and upper frames arranged above the down frames extend to rearwardly and downwardly from a head pipe constituting a front end part of a body frame, and the down frames and forward extending parts constituting upper parts of the middle covers and extending toward the front part of the body are arranged so as to overlap each other in a side view.

7. The body cover structure for saddle-ride type vehicles according to claim 3, wherein down frames and upper frames arranged above the down frames extend to rearwardly and downwardly from a head pipe constituting a front end part of a body frame, and the down frames and forward extending parts constituting upper parts of the middle covers and extending toward the front part of the body are arranged so as to overlap each other in a side view.

8. The body cover structure for saddle-ride type vehicles according to claim 2, wherein the erect walls are provided with stepped parts so as to run along the front edges of the middle covers and the front edges of the middle covers are brought into contact with and fitted to these stepped parts.

9. The body cover structure for saddle-ride type vehicles according to claim 1, wherein a first engaging part with which the inner cover and the erect wall are engaged is provided inside the middle covers, and second engaging parts with which the inner cover, the erect walls, and the middle covers are engaged are provided at upper and lower end parts of the middle covers so as to sandwich the first engaging part vertically.

10. The body cover structure for saddle-ride type vehicles according to claim 2, wherein a first engaging part with which the inner cover and the erect wall are engaged is provided inside the middle covers, and second engaging parts with which the inner cover, the erect walls, and the middle covers are engaged are provided at upper and lower end parts of the middle covers so as to sandwich the first engaging part vertically.

11. The body cover structure for saddle-ride type vehicles according to claim 3, wherein a first engaging part with which the inner cover and the erect wall are engaged is provided inside the middle covers, and second engaging parts with which the inner cover, the erect walls, and the middle covers are engaged are provided at upper and lower end parts of the middle covers so as to sandwich the first engaging part vertically.

12. The body cover structure for saddle-ride type vehicles according to claim 1, wherein concaves extending in the longitudinal direction of the body are provided on boundaries between the middle covers and the erect walls.

13. The body cover structure for saddle-ride type vehicles according to claim 2, wherein concaves extending in the longitudinal direction of the body are provided on boundaries between the middle covers and the erect walls.

14. The body cover structure for saddle-ride type vehicles according to claim 3, wherein concaves extending in the longitudinal direction of the body are provided on boundaries between the middle covers and the erect walls.

15. The body cover structure for saddle-ride type vehicles according to claim 1, wherein the erect walls are disposed farther out than the middle covers in the vehicle width direction.

16. The body cover structure for saddle-ride type vehicles according to claim 2, wherein the erect walls are disposed farther out than the middle covers in the vehicle width direction.

17. The body cover structure for saddle-ride type vehicles according to claim 1, wherein the bent parts are provided underneath the forward inclined part with a second bent part, the second bent part bends convexly rearwardly in a side view, and the second bent part is closer to the downwardly extending part than the step floors near the second bent part are.

18. The body cover structure for saddle-ride type vehicles according to claim 2, wherein the bent parts are provided underneath the forward inclined part with a second bent part, the second bent part bends convexly rearwardly in a side view, and the second bent part is closer to the downwardly extending part than the step floors near the second bent part are.

19. A body cover structure for saddle-ride type vehicles comprising:
   a center tunnel part;
   step floors for placing legs of an occupant, said step floors being disposed on each side of the center tunnel part and extending in the longitudinal direction, the center tunnel part being configured of an inner cover extending rearwardly from a leg shield, erect walls extending upwardly from inner side end parts of the step floors in the vehicle width direction, and middle covers arranged to be long in the longitudinal direction so as to stride over the inner cover and the erect walls;
   said step floors including forward inclined parts disposed ahead of thereof in a forward rising shape, horizontal parts disposed either substantially horizontally or in a rearwardly rising shape behind these forward inclined parts, and bent parts connecting the forward inclined parts and the horizontal parts; and
   downwardly extending parts formed on lower edges of the middle covers, said downwardly extending parts extending toward the bent parts.

20. The body cover structure for saddle-ride type vehicles according to claim 19, wherein the middle covers have, formed on front edges thereof, dented parts recessed toward a rear part of the body above the downwardly extending parts.

* * * * *